March 8, 1932. G. M. WARNER 1,848,919
MEASURING DISPENSER
Filed Jan. 13, 1931
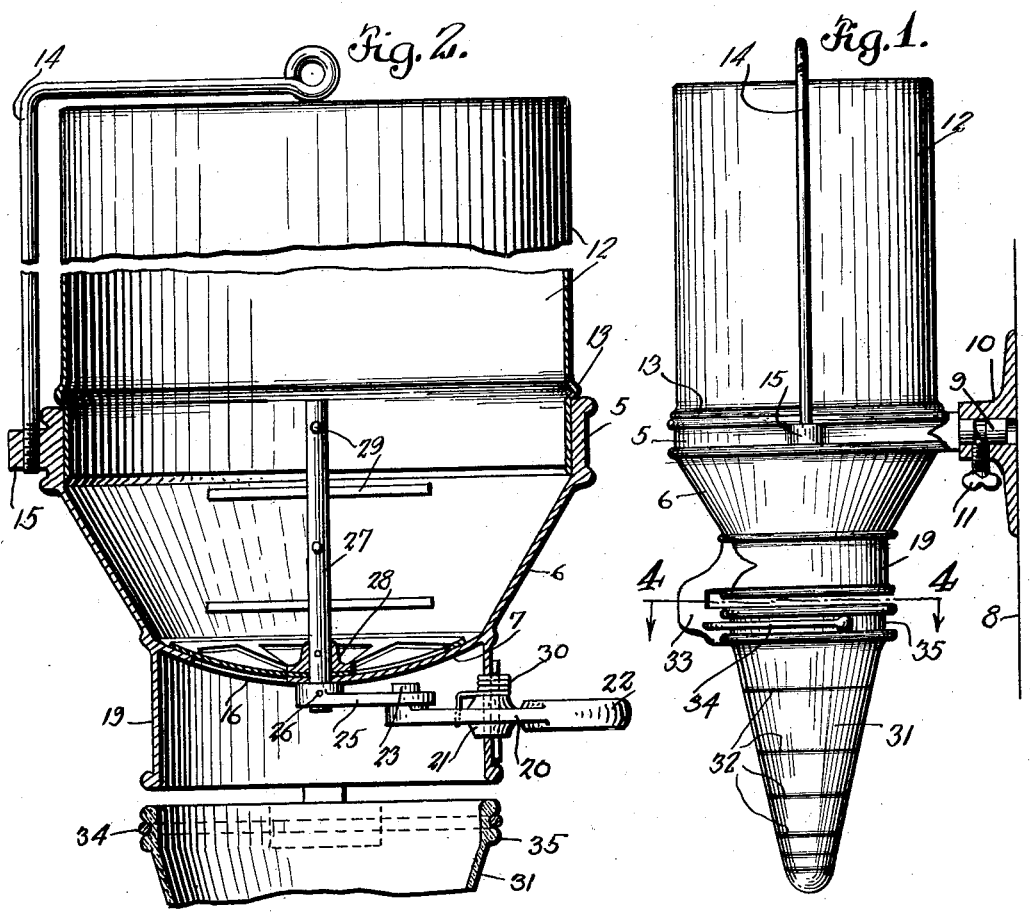
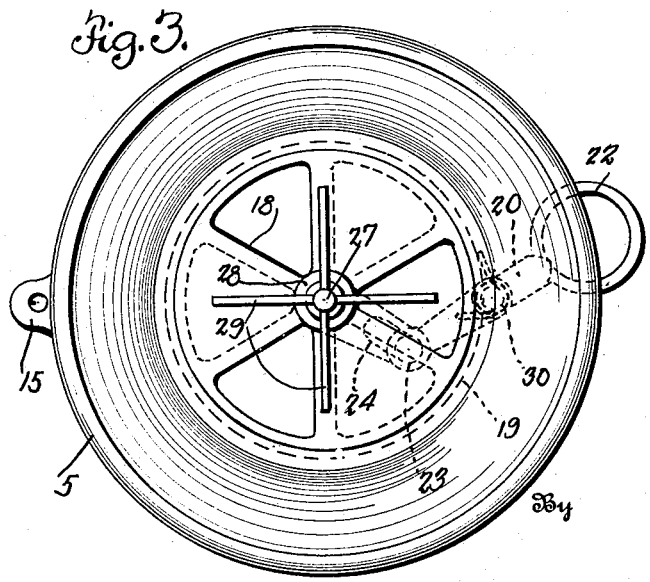
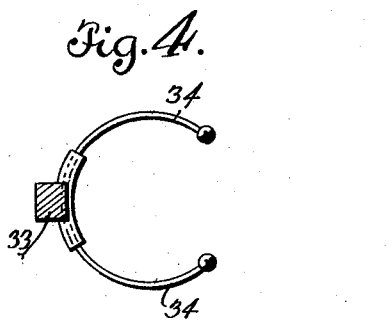
Inventor
Georgia M. Warner.
By Bryant Lowry
Attorneys Patented Mar. 8, 1932

1,848,919

UNITED STATES PATENT OFFICE

GEORGIA M. WARNER, OF HARTFORD, CONNECTICUT

MEASURING DISPENSER

Application filed January 13, 1931. Serial No. 508,509.

This invention relates to certain new and useful improvements in measuring dispensers.

The primary object of the invention is to provide a device for measuring the dispensed material of a fluent character, such as powdered or granulated, the container for the material being removably supported in an inverted position with a manually operable valve controlled opening at its lower end and constructed for the detachable support of a measuring vessel or cup whereby a predetermined quantity of fluent material may be discharged from the container into the cup.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of a measuring dispenser constructed in accordance with the present invention, the bracket mounting therefor being shown in section;

Figure 2 is an enlarged vertical cross-sectional view, partly broken away, showing the valve operating mechanism and agitator for the fluent material;

Figure 3 is a top plan view of the support for the material container; and

Figure 4 is a cross-sectional view taken on line 4—4 of Figure 1 with the measuring cup removed and illustrating the spring arms for supporting the cup.

While the invention disclosed herein is primarily adapted for the dispensing of powdered or granulated materials, such as flour, sugar, ground coffee and the like, it is to be understood that the same may well be used for dispensing of other materials and comprises a rotatably shiftable support with which a material container is detachably engaged the support being shiftably positioned to permit the container to be mounted thereon when the latter is in an upright position and thereafter shifted to place the container in an inverted position for the discharge or dispensing of material. A manually operated valve mechanism and agitator for the material is located within the support and said support is equipped with means for the separable attachment of a measuring cup or the like to receive the dispensed material.

Referring more in detail to the accompanying drawings there is illustrated a dispensing apparatus comprising a support for a material container and a measuring cup or the like, the support including a body portion having an annular band 5 with a tapering or conical side wall 6 merging into a concaved bottom wall 7, the support is adapted to be attached to a wall or the like as indicated at 8 in Figure 1 and to accommodate such mounting, the band 5 of the support carries an annularly grooved pin 9 to be received in a bearing opening in the wall bracket 10 and retained in rotatably adjusted positions by the screw pin 11 threaded through the wall bracket and engaged in the groove of the pin 9.

The container 12 for the powdered, granulated or fluent material being cylindrical in cross section and formed of any suitable material desired as the open end thereof is inserted in the band 5 when the latter is inserted or in a position reversed to what is illustrated on the drawings, the support being then shifted in the wall bracket 10 to place the container 12 in the inverted position illustrated, the container being supported in the band 5 of the receptacle by the annular bead 13 resting upon the upper edge of the band as shown in Figure 2. To prevent accidental separation of the container from the support, there is provided an angle arm 14 having one end thereof slidably engaged with the lug 15 carried by the band 5 with its other end movable to a position to overlie the upper closed end of the container.

The concaved bottom wall 7 of the support is provided with a circular series of valve openings 16 of segmental form and a valve plate 17 of concaved form as illustrated in Figure 2 is placed in engagement with the bottom wall 7 and has a circular series of openings 18 therein of segmental form that are adapted to be brought into registry with the bottom openings 16 to permit the flow of material through the support. An annular flange 19 depends from the lower edge of the side wall 6 at its point of connection with the bottom wall 7 and provides a support for the hand lever 20 that is associated with operating means for the valve plate 17 and an agitator extending upwardly within the support and axially thereof. The lever 20 is pivotally mounted as at 21 through an opening in the annular flange 19 and has an operating finger ring 22 at its outer end, the inner end of the lever 20 carrying a laterally directed pin 23 extending into the slot 24, illustrated by dotted lines in Figure 3 and provided in the arm 25. The other end of the arm 25 is fixed as at 26 to the lower end of the shaft 27 extending upwardly through the bottom wall of the support, the shaft 27 being secured to the valve plate 17 by the center hub 28 and said shaft within the support carries radially directed arms 29 to effect agitation of the material within the support and container during operation of the valve plate 17 by the hand lever 20. The openings 16 in the bottom wall 7 of the support are normally closed by the valve plate 17, the latter being retained in such position by the coil spring 30 associated with the pivot mounting 21 of the lever 20 shown in Figures 2 and 3.

The measuring cup 31 provided with graduations 32 for determining the quantity of material to be dispensed from the container is removably positioned beneath the flange 19, the support for the cup 31 comprising a bracket arm 3 that laterally projects and depends from the flange 19 as shown in Figure 1 with a spring clip 34 at its lower end to receive and support the cup 31 by being engaged with the annularly grooved upper end 35 thereof as illustrated.

From the above detailed description of the invention, it is believed that the construction and operation thereof will at once be understood, it being noted that the spring 30 in holding the lever 20 at its limit of movement in one direction, also effects the closing of the valve plate 17 relative to the discharge openings 16 in the bottom wall 7 of the support and that when said lever is operated by the finger piece or ring 22, the material to be dispensed is agitated by the arms 29 and the valve plate 17 shifted to permit the material to flow through the openings 16 and into the measuring cup 31, the quantity of material to be dispensed being determined by the graduations 32 upon the cup 31. It is also considered to be within the realm of this invention to substitute weighing scales or a scale pan for the measuring cup 31 so that material delivered from the container may be dispensed by weight or volume.

While there is herein shown and described the preferred embodiment of the invention, it is nevertheless to be understood that minor changes may be made therein without departing from the spirit and scope of the invention as claimed.

I claim:—

1. In a measuring dispenser of the character described, a rotatably adjustable support, an inverted container in the support, a measuring cup detachably mounted on the lower end of the support, combined valve and agitator means in the support controlling discharge of material therefrom into the measuring cup, an annular flange depending from the support, a tensioned lever pivoted in the flange, the agitator including a shaft depending from the support, and an arm connecting the lower end of the agitator shaft to the lever.

2. In a measuring dispenser of the character described, a rotatably adjustable support, an inverted container in the support, a measuring cup detachably mounted on the lower end of the support, combined valve and agitator means in the support controlling discharge of material therefrom into the measuring cup, the mounting for the measuring cup including a bracket depending from the support, and a spring clip carried by the bracket with which the cup is engaged.

3. In a measuring dispenser of the character described, a rotatably adjustable support, an inverted container in the support, a measuring cup detachably mounted on the lower end of the support, combined valve and agitator means in the support controlling discharge of material therefrom into the measuring cup, the support comprising an annular band, a bead on the open end of the container resting on the band, the mounting for the measuring cup including a bracket depending from the support, and a spring clip carried by the bracket with which the cup is engaged.

4. In a measuring dispenser of the character described, a rotatably adjustable support, an inverted container in the support, a measuring cup detachably mounted on the lower end of the support, combined valve and agitator means in the support controlling discharge of material therefrom into the measuring cup, the support comprising an annular band, a bead on the open end of the container resting on the band, an angle arm carried by the band adapted to have one end overlie the container to retain the latter in position, the mounting for the measuring cup including a bracket depending from the support, and a spring clip carried by the bracket with which the cup is engaged.

In testimony whereof I affix my signature.

GEORGIA M. WARNER.